United States Patent [19]

Takahashi et al.

[11] Patent Number: 5,739,926
[45] Date of Patent: Apr. 14, 1998

[54] METHOD OF TRANSMITTING AND RECEIVING IMAGE DATA AND APPARATUS WHICH IS USED IN SUCH A METHOD

[75] Inventors: Kazuyoshi Takahashi, Kawasaki; Yasuhiro Yamada, Yokohama, both of Japan

[73] Assignee: Canon Kabushiki Kaisha, Tokyo, Japan

[21] Appl. No.: 477,266

[22] Filed: Jun. 7, 1995

Related U.S. Application Data

[62] Division of Ser. No. 285,522, Aug. 4, 1994, which is a continuation of Ser. No. 956,478, Oct. 2, 1992, which is a continuation of Ser. No. 614,501, Nov. 16, 1990.

[30] Foreign Application Priority Data

Nov. 28, 1989 [JP] Japan ................... 1-310001

[51] Int. Cl.$^6$ ................... H04N 1/46; G03F 3/08; G03F 15/00
[52] U.S. Cl. ................... 358/529; 358/539; 358/452; 358/467; 395/109; 395/790
[58] Field of Search ................... 358/529, 500, 358/515, 523, 526, 527, 537, 539, 467, 445, 405, 462, 452, 461, 447, 463, 464; 382/284, 291, 295; 345/150, 153; 348/423; 395/109, 790, 792, 782

[56] References Cited

U.S. PATENT DOCUMENTS

| | | | |
|---|---|---|---|
| 4,262,302 | 4/1981 | Sexton | 348/180 |
| 4,549,219 | 10/1985 | Sue et al. | |
| 4,672,459 | 6/1987 | Kudo | 358/452 |
| 4,680,626 | 7/1987 | Deering et al. | 358/75 |
| 4,713,684 | 12/1987 | Kawamura et al. | 358/78 |
| 4,771,335 | 9/1988 | Obara | 358/442 |
| 4,814,891 | 3/1989 | Uchiyama et al. | 358/521 |
| 4,825,390 | 4/1989 | Van Aken et al. | 358/518 |
| 4,896,208 | 1/1990 | Moriya et al. | 358/452 |
| 4,905,091 | 2/1990 | Suzuki et al. | 358/296 |
| 5,001,653 | 3/1991 | Buchanan et al. | 364/523 |
| 5,060,059 | 10/1991 | Mori et al. | 358/79 |
| 5,175,635 | 12/1992 | Yamada et al. | 358/467 |
| 5,506,944 | 4/1996 | Gentile | 395/114 |
| 5,521,990 | 5/1996 | Ishizawa et al. | 382/270 |

FOREIGN PATENT DOCUMENTS 68907  6/1978  Japan.

*Primary Examiner*—Edward L. Coles, Sr.
*Assistant Examiner*—Madeleine Av. Nguyen
*Attorney, Agent, or Firm*—Fitzpatrick, Cella, Harper & Scinto

[57] ABSTRACT

A system of transmitting and receiving image data comprising a number of pixel data, such as color copying machine or the like, comprises producing image control data regarding the image data to be transmitted on a transmission side; transmitting pixel data of n colors for a period of time when the pixel data of (n+m) colors (n and m are positive integers) can be sequentially transmitted and transmitting the image control data for a period of time when the pixel data of n colors is not transmitted in the period of time when the pixel data of (n+m) colors can be transmitted; producing the pixel data of (n+m) colors on the basis of the pixel data of n colors on a reception side; and executing an image process to the pixel data of n colors or the pixel data of (n+m) colors on the basis of the image control data.

18 Claims, 9 Drawing Sheets

METHOD OF TRANSMITTING AND RECEIVING IMAGE DATA AND APPARATUS WHICH IS USED IN SUCH A METHOD

This application is a division of application Ser. No. 08/285,522 filed on Aug. 4, 1994, which is a continuation of application Ser. No. 07/956,478 filed on Oct. 2, 1992, which is a continuation of application Ser. No. 07/614,501 filed on Nov. 16, 1990.

BACKGROUND OF THE INVENTION

1. Field of the Invention

The present invention relates to a method of transmitting and receiving image data which is suitably embodied in, for instance, a color copying machine or the like, in which original reading data comprises pixel data of respective colors such as R (red), G (green), and B (blue) and the image data has a time-dependent space area for K (black) data which is produced at the output stage. The invention also relates to an apparatus which is used in such a method.

2. Related Background Art

Ordinarily, in a color copying machine or the like, image signals of the respective colors of R (red), G (green), and B (blue) are produced in the image reading unit by using a reading sensor, such as a CCD. The image signals are converted into the image signals of C (cyan), M (magenta), and Y (yellow) as complementary colors of R, G, and B by predetermined image processing circuits. An image is formed on the basis of the image signals. At this time, there is a problem such that black cannot be clearly expressed, even mixing the color materials of C, M, and Y. Therefore, in an image printing unit, there is used a method whereby an image signal of black is produced from the three color signals of R, G, and B in addition to the image signals of C, M, and Y. A clear image is printed by using materials of four colors including for example, a black ink or toner in correspondence to the black image signal.

According to such a method, generally, the time-dependent areas to transmit and receive the image signals of four colors in the image printing unit are also assured even when the image data of R, G, and B are transmitted.

A color copying machine 16 using the above method will now be described with reference to a block diagram of FIG. 1.

image signals which are obtained by reading an image by an image sensor 1 are output as four kinds of signals of R, G, B, and X. In this case, X denotes a blank signal indicative of a time-dependent area to transmit and receive black data which is produced by a black data producing circuit (UCR) 8 at the output stage.

That is, the data of one pixel is output in a form such as to time-sequentially include four signals of (R, G, B, X).

An output of the image sensor 1 is an analog signal and is amplified by an amplifier 2 at the output stage having a predetermined gain for every color. The amplified signal is then converted into a digital signal by an A/D converter 3 at the next stage.

Although each dot of the image sensor 1 ideally generates the same electrical output for a certain light intensity, there is actually a variation among the respective dots. To prevent the occurrence of a variation in light and dark images upon printing of an image due to a variation of the image sensor 1, a shading circuit 4 is provided at the next stage, thereby correcting an output variation of the image sensor 1.

A black character processing circuit 5 at the next stage extracts the portions of black characters in the read original. A black character area signal which is output from the processing circuit 5 is used in a black character conversion circuit 14 at the output stage. In the example of FIG. 1, an image editor unit 17 can be connected as an external apparatus through an I/F cable 18. The image editor unit 17 mainly has two functions and has two circuits 17a and 17b to realize those functions. The color conversion circuit 17a realizes a color converting function such as to change, for instance, a yellow image into a red image. The area control circuit 17b realizes an area control function to execute a predetermined process for an area which is designated by using a digitizer (not shown) provided for the image editor unit 17. The image editor unit 17 is used, for instance, in the case where a certain area in an original is erased or where only a certain area in an original is converted into a blue image. In the case where the image editor unit 17 is not used, an output of a black character processing circuit 5 is given to a variable multiplication processing circuit 6.

The image data from the image editor unit 17 is variably magnified into a desired size by the processing circuit 6.

Practically speaking, for example, in the case of enlarging, the same data is read out a plurality of times. In the case of reducing, the image data is thinned out in accordance with a reduction ratio.

Although the image data which is input to and output from each of the circuits 1 to 6, 17a, and 17b mentioned above is the luminance data which is obtained by converting a reflected light, of the light which was irradiated onto an original, into an electric signal, density data is needed to print.

Therefore, the luminance data from the variable multiplication processing circuit 6 is converted into the density data by a LOG converter 7. On the other hand, the LOG converter 7 converts the luminance data into the data indicative of C, M, and Y by the bit inverted data of the data indicative of R, G, and B. The UCR 8 at the next stage produces black data on the basis of the data of C, M, and Y. As mentioned above, the image data does not include the black data until the circuits before the UCR 8. The image data includes the black data in the UCR 8 and subsequent circuits (such image data is shown by blank arrows; in the diagram).

A masking circuit 9 executes a correcting process according to the characteristics of the image sensor 1 and of the toner which is used in a printing unit 15. A density conversion circuit 11 executes a density converting process of each color in accordance with the operation of an operating unit (not shown). On the other hand, a binarization processing circuit 12 executes a binarizing process based on a dither method, an error diffusion method, or the like.

In such a color copying machine, for instance, a black character area signal which is produced by the black character processing circuit 5 in FIG. 1 is sent to the black character conversion circuit 14 at the output stage synchronously with the image signal.

On the other hand, a plurality of area signals generated from the image editor unit 17 are also sent to the output stage synchronously with the image data.

Further, a photograph control signal which is generated in the case of partially processing as a photograph is used in a character photograph processing circuit 10 at the output stage. In the case of partially erasing or leaving an image, one of the area signals is used in a trim mask circuit 13.

In addition to the above signals, a negative/positive signal, a character synthesis signal, and the like (not shown here) are also included as various kinds of image control signals which are produced by the image editor unit 17.

As mentioned above, there are a plurality of kinds of image control signals to be transmitted synchronously with the image. There is a problem such that when those signals are transmitted and received via the I/F cable 18, the number of terminals of the connectors and the number of poles of the cables are increased, so that the costs rise.

On the other hand, since the image control signals relate to the image processing contents to be executed for every pixel, the image control signals need to be synchronized with the image data. Therefore, the image control signals must be delayed by only the time which is required to execute an image process such as color conversion, area control, or the like in the image editor unit 17. Accordingly, a delay circuit 17c must be provided for the image editor unit 17. There is also a problem such that a circuit construction becomes complicated. Such a problem also occurs even in the case where the image editor unit is not connected as shown in FIG. 1. That is, in more general, as shown in FIG. 2, in the case where image data which was read by an image reading unit 101 is subjected to an image process to form image control signals by an image processor 102 and is further subjected to an image process using the image control signals by an image processor 104 through an image processor 103, the image control signals must be delayed by only the time which is required for the image process which is performed by the image processor 103. For this purpose, a delay circuit 105 is provided and it is necessary to synchronize the image data and the image control signals. In such a case, the circuit construction also becomes complicated.

SUMMARY OF THE INVENTION

It is an object of the invention to provide an image data transmitting and receiving method which can solve the above technical problems and can simplify connectors or a circuit construction and can also realize the reduction of the costs without losing the performance and to also provide an apparatus which is used to embody such a method.

According to the invention, since the image control signals are transmitted for a period of time when the pixel data of n colors are not transmitted, the image control signals can be transmitted by using a signal line to transmit the image data. Therefore, the signal line which is provided only for transmitting the image control signals is unnecessary and a construction of the connectors or the like is simplified.

On the other hand, since the image control signals can be transmitted by the same signal line as the line which is used to transmit the image data, even when executing an image process or the like to the image data, there is no need to synchronize the image control signals with the image data. Thus a delay circuit or the like is unnecessary and the circuit construction is simplified.

The above and other objects and features of the present invention will become apparent from the following detailed description and the appended claims with reference to the accompanying drawings.

DETAILED DESCRIPTION OF THE PREFERRED EMBODIMENTS

A preferred embodiment of the invention will be described in detail hereinbelow with reference to the accompanying drawings.

Figure 3:
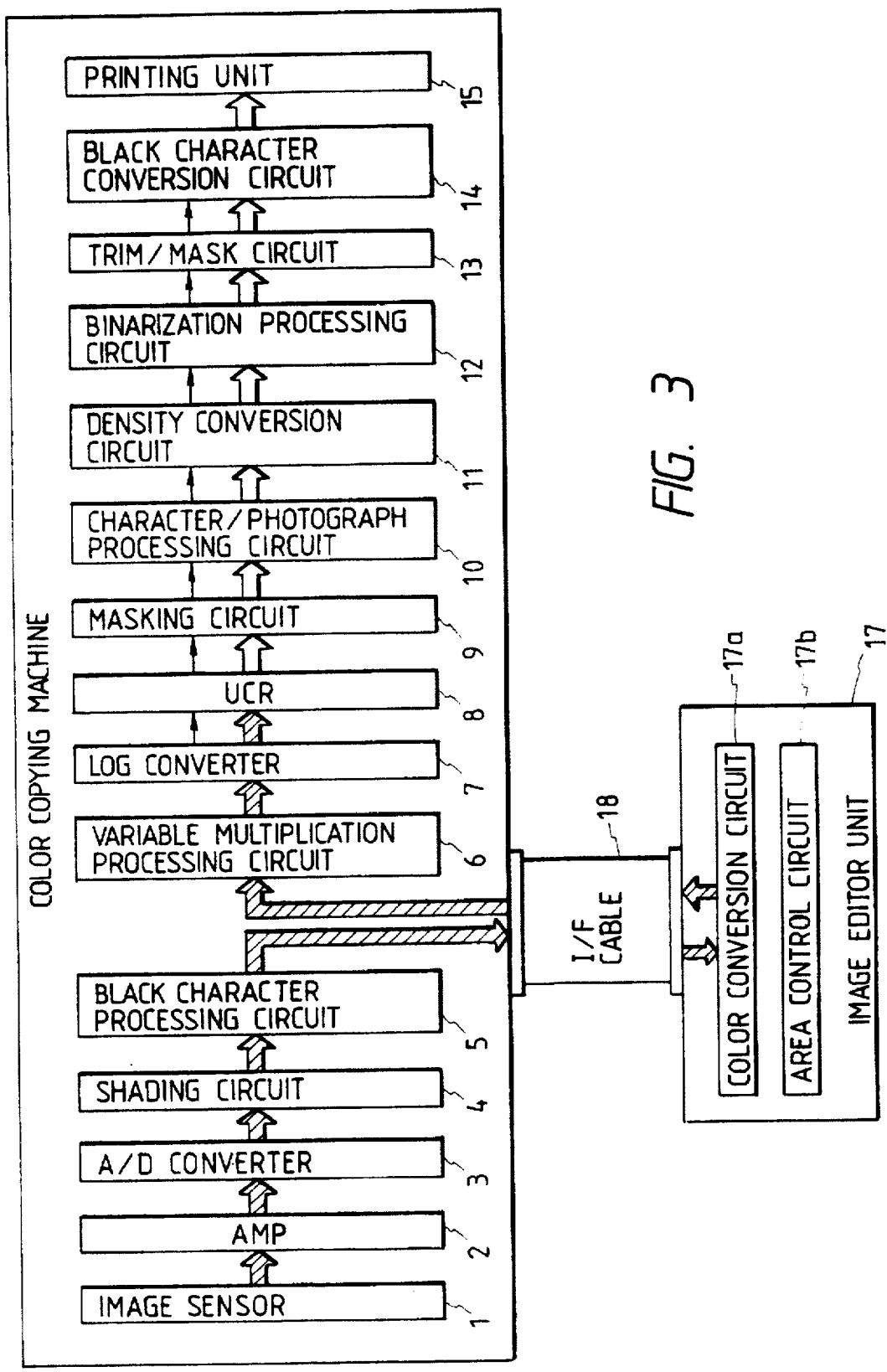
FIG. 3 is a block diagram showing a construction of a color copying machine according to an embodiment of the present invention.

FIG. 3 is a block diagram showing a construction of the color copying machine 16 according to an embodiment of the invention image signals which are obtained by reading an image by the image sensor 1 are output as four kinds of signals of R, G, B, and X. X denotes the blank signal and indicates a time-dependent area to transmit and receive the black data produced by the black data producing circuit (UCR) 8 at the output stage.

That is, the image data of one pixel is output in a form such as to time-sequentially include the four signals of (R, G, B, X).

The output of an image sensor is the analog signal and is amplified by the amplifier 2 at the output stage having a predetermined gain for every color. The amplified signal is then converted into a digital signal by the A/D converter 3 at the next stage. In the embodiment, the image data of each color expresses the gradations by eight bits and the respective image data are communicated as 8-bit parallel data.

Although the dots of the image sensor 1 ideally generate the same electric outputs for a certain light intensity, there is actually a variation among the dots. To prevent the occurrence of a variation of the light and dark images upon printing of an image due to the variation of the image sensor 1, a shading circuit 4 at the next stage is provided to correct the output variation of the image sensor 1.

Practically speaking, the shading circuit 4 providing uniform gradations of the dots by setting a reflected output of a standard white plate into white data and by setting an output which is obtained in an off stage of an exposing lamp into black data.

The black character processing circuit 5 at the next stage extracts the portions of black characters in an original to be read. A black character area signal which is generated from the processing circuit 5 is used in the black character conversion circuit 14 at the output stage.

The black character area signal is one of the image control signals and is fetched as a signal of one bit or two bits of the blank signal X as will be explained hereinlater.

In the embodiment of FIG. 3, the image editor unit 17 can be connected as an external apparatus via the I/F cable 18. The image editor unit 17 mainly has two functions. Two circuits 17a and 17b are provided for the image editor unit 17 to realize those functions. The color conversion circuit 17a realizes a color converting function such as to change a yellow image into a red image. The area control circuit 17b realizes an area control function to execute a predetermined process to an area designated by using a digitizer (not shown) which is provided for the image editor unit 17. Such an image editor unit is used, for instance, in the case where a certain area of an original is erased or where only a certain area is converted into a blue area. In the case where the image editor unit 17 is not used, an output of the black character processing circuit 5 is provided to the variable multiplication processing circuit 6.

At the pixels of the designated area, the data indicative of the masking or trimming process is input to one bit in the blank signal X as an image control signal. On the other hand, in the embodiment, with respect to the pixels of the area to be subjected to the photograph process as well, the image control signal is input to another one bit in the blank signal X.

The image data which passed through the image editor unit 17 is variably magnified into a desired size by the variable multiplication processing circuit 6.

Practically speaking, for instance, in the case of enlarging, the same data is read out a plurality of times. In the case of reducing, the image data is thinned out in accordance with a reduction ratio.

The image data which is input to and output from each of the circuits 1 to 6, 17a, and 17b mentioned above is the luminance data which is obtained by converting the reflected light of the light irradiated onto an original into the electric signal. However, density data is needed to print. Therefore, the density data from the variable multiplication processing circuit 6 is converted into the density data by the LOG converter 7. The luminance data is also converted into the data indicative of C, M, and Y by the bit inverted data of the data of R, G, and B.

Further, the LOG converter 7 extracts the image control signals inserted in the blank signal X as will be explained hereinlater and outputs to a signal line which is separately provided.

The UCR 8 at the next stage produces black data on the basis of the data of C, M, and Y. Therefore, the image data which is shown by hatched arrows does not include the black data until the circuits before the UCR 8. The foregoing image control signals are included in the blank signal X. On the other hand, as shown by blank arrows, the image data includes the black data in the UCR 8 subsequent circuits.

The masking circuit 9 executes the correction according to the characteristics of the image sensor 1 and of the toner which is used in the printing unit 15. The character photograph processing circuit 10 executes a partial photograph process on the basis of the image control signals produced in the image editor unit 17. The density conversion circuit 11 executes a density converting process of each color in accordance with the operation of the operating unit (not shown). The binarization processing circuit 12 executes a binarizing process based on a dither method, an error diffusion method, or the like. The trim mask circuit 13 executes a trimming or masking process of the designated area on the basis of the image control signals as will be explained hereinlater. The black character conversion circuit 14 performs a process, which will be explained hereinlater, on the basis of the image control signals produced by the black character processing circuit 5.

A construction to insert the image control signals into the blank signal X of the image data will now be described. A selector circuit 28 as shown in FIG. 4 is provided for the circuit to produce the image control signals.

Figure 4:
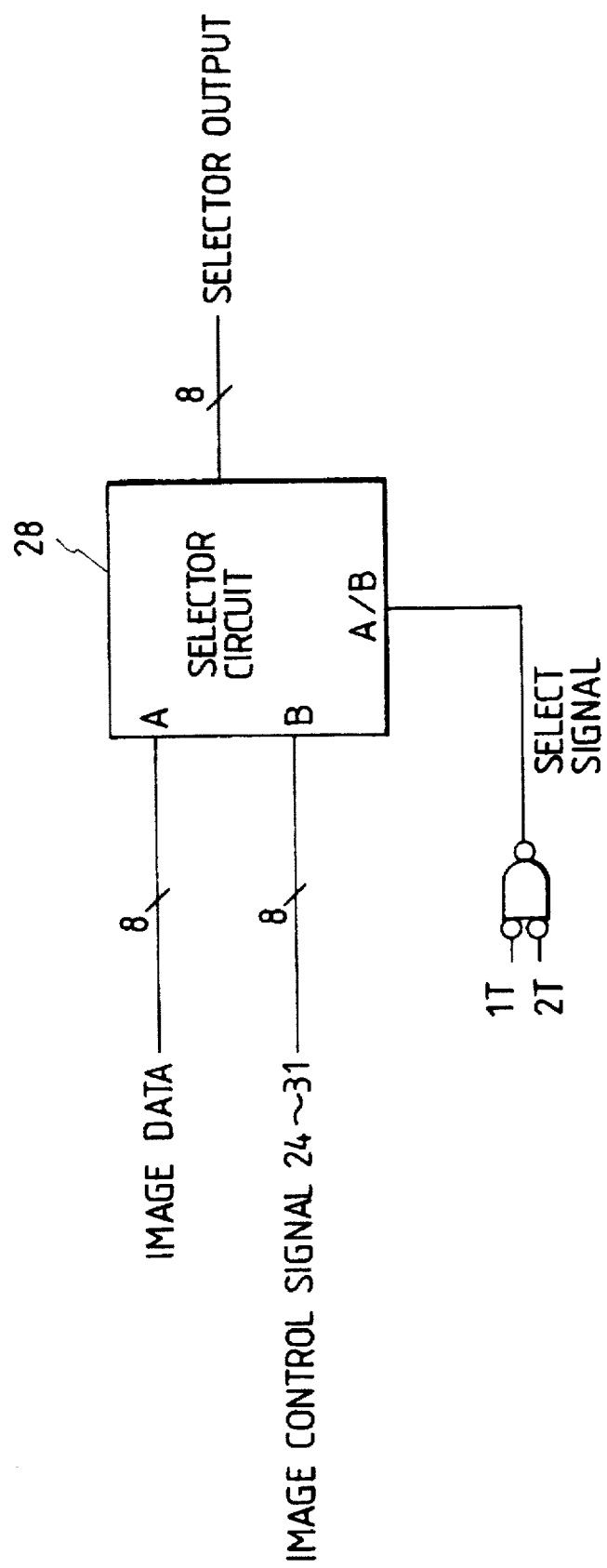
FIG. 4 is a diagram showing a circuit for inserting image control signals into an area of a blank signal X of image data.
Figure 5:
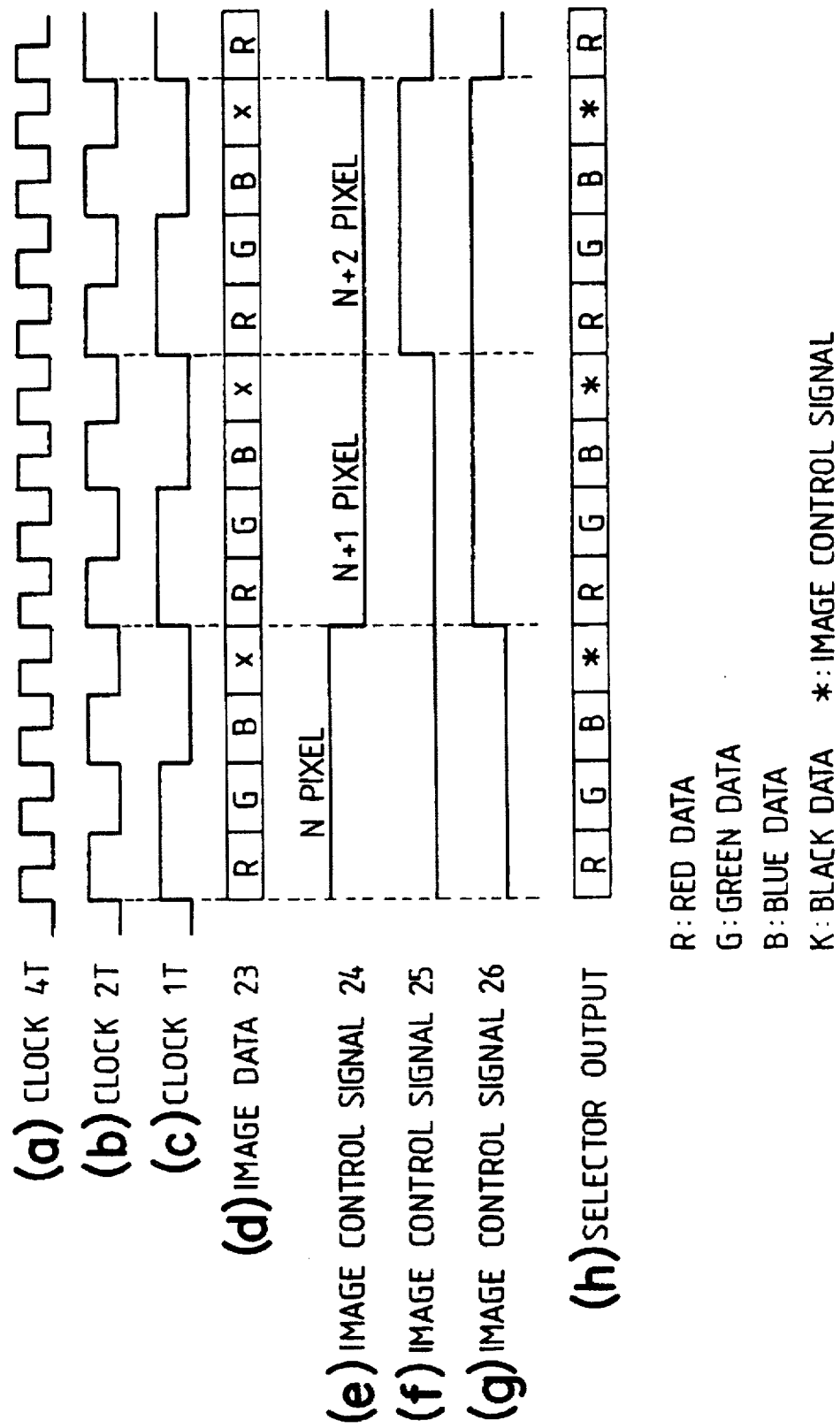
FIG. 5 is a timing chart for the circuit shown in FIG. 4.

FIG. 5 shows a timing chart for the circuit of FIG. 4.

The image data of R, G, B, and X are time-sequentially communicated synchronously with a clock 4T because clock 1T is synchronized for one pixel and the color data of four colors are included in one pixel. The image control signals ordinarily change as shown by reference numerals 24 to 26 (only three bits are shown in the diagram) in correspondence to a one-pixel unit. To insert the image control signals 24 to 31 into the area of the blank signal X of image data 23, the image control signals and the image data are switched at a timing of 1T=2T="L", thereby obtaining a selector output.

Figure 6:
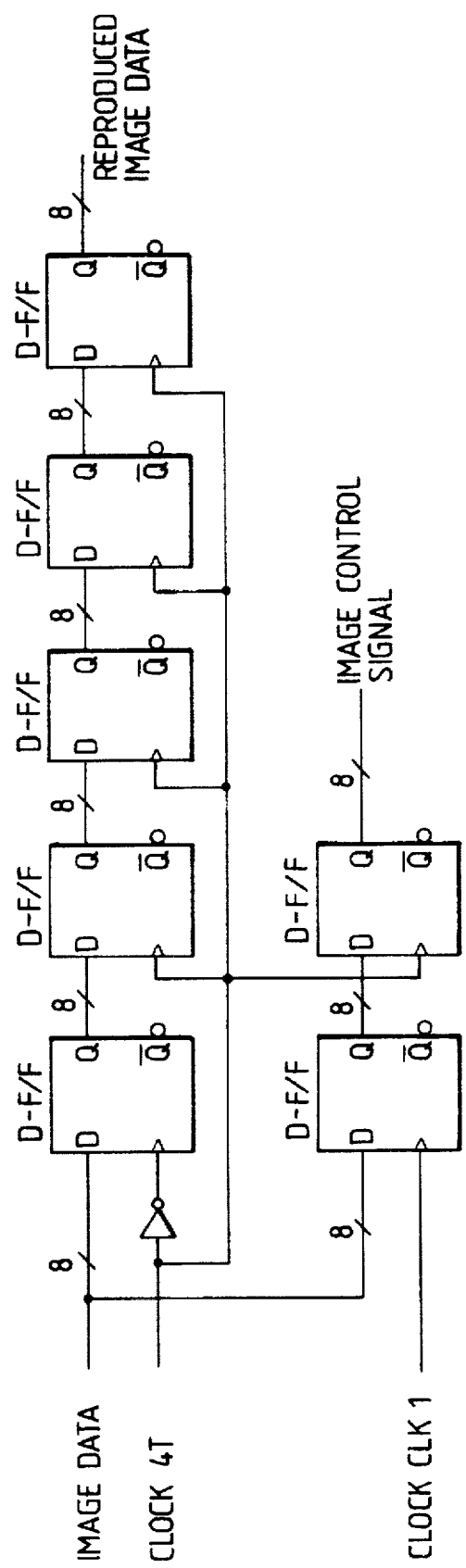
FIG. 6 is a diagram showing a circuit to extract image control signals from image data.
Figure 7:
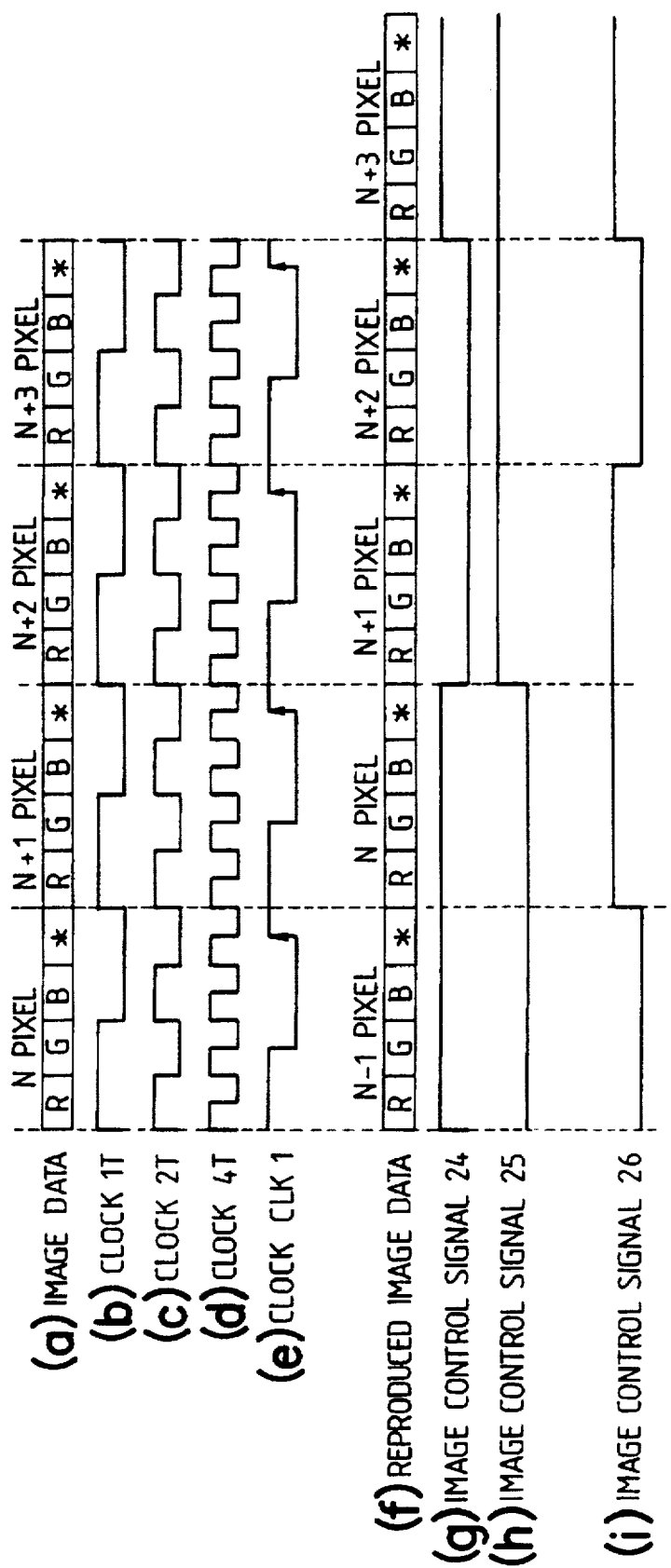
FIG. 7 is a timing chart of the circuit shown in FIG. 6.

FIG. 6 shows a circuit provided in the LOG converter 7. The circuit of FIG. 6 is used to extract the image control signals included in the area of the blank signal X of the image data. FIG. 7 is a timing chart for the circuit of FIG. 6. Seven D-type flip-flops (D-F/F) are used in the circuit.

Since a block $CLK_1$ in which the phase of the clock 1T is shifted is used to extract the image control signals inserted in "*" of the image data 23, a delay of a time corresponding to one pixel is caused between the image data and the image control signal as shown in FIG. 7.

The reproduced image data obtained by simply delaying image data and the image control signals extracted at a timing of the clock $CLK_1$ are derived.

Figure 8:
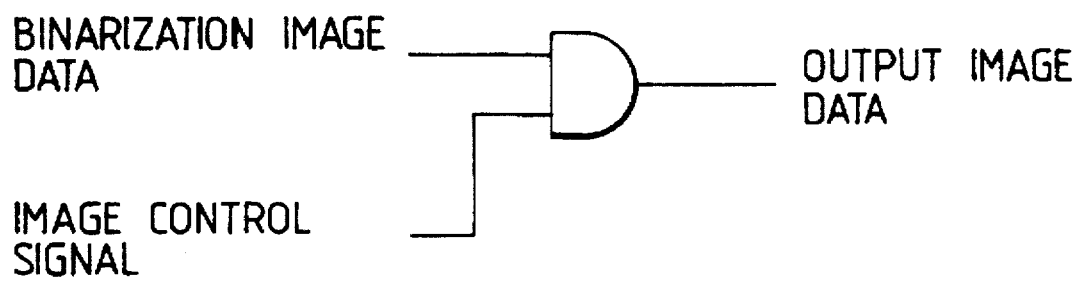
FIG. 8 is a diagram showing an example of a trim mask circuit 13.
Figure 9:
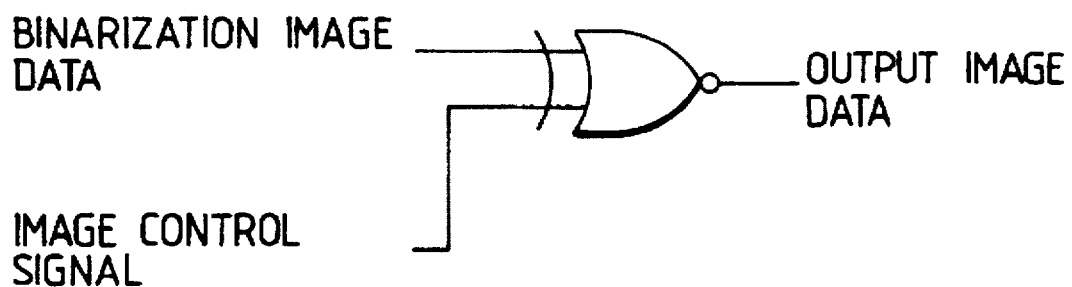
FIG. 9 is a diagram showing an example of a negative/positive conversion circuit.
Figure 10:
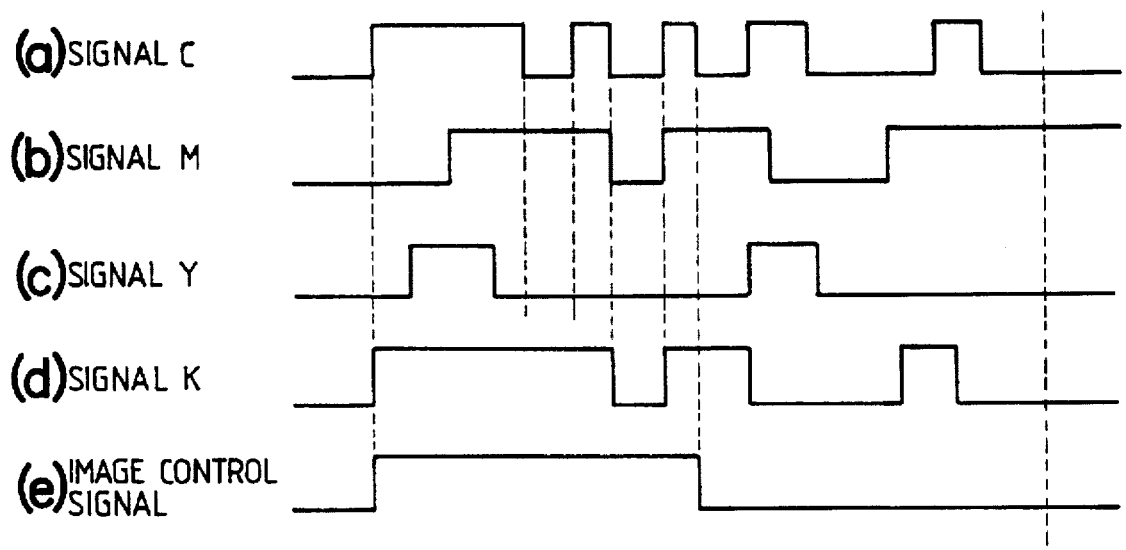
FIG. 10 is a timing chart for explaining the operation of a black character conversion circuit 14.

FIG. 8 shows an example of the trim mask circuit 13. By calculating the AND of the binarized image data and a predetermined one bit of the image control signal, the pixel is masked when the image control signal is set to "0". In the trimming process, the logical value of the image control signal is inverted. On the other hand, in the case of executing the negative/positive conversion, it is sufficient to use a circuit shown in FIG. 9. The black character conversion circuit 14 extracts the black data K when the image control signal is active as shown in a timing chart of FIG. 10. The C, M, and Y signals are set to the low level after that.

As mentioned above, in the embodiment, by inserting the image control signals into the area of the blank signal X of the image data, the construction of the connector portion to connect with the image editor unit 17 can be simplified, the delay circuit or the like can be omitted, and the circuit construction can be simplified.

Although the embodiment has been described with respect to the case of sequentially transmitting the pixel data of one pixel every color, for instance, the pixel data of one line can be also sequentially transmitted every color or the pixel data of a plurality of predetermined pixels can be also sequentially transmitted every color.

Figure 1:
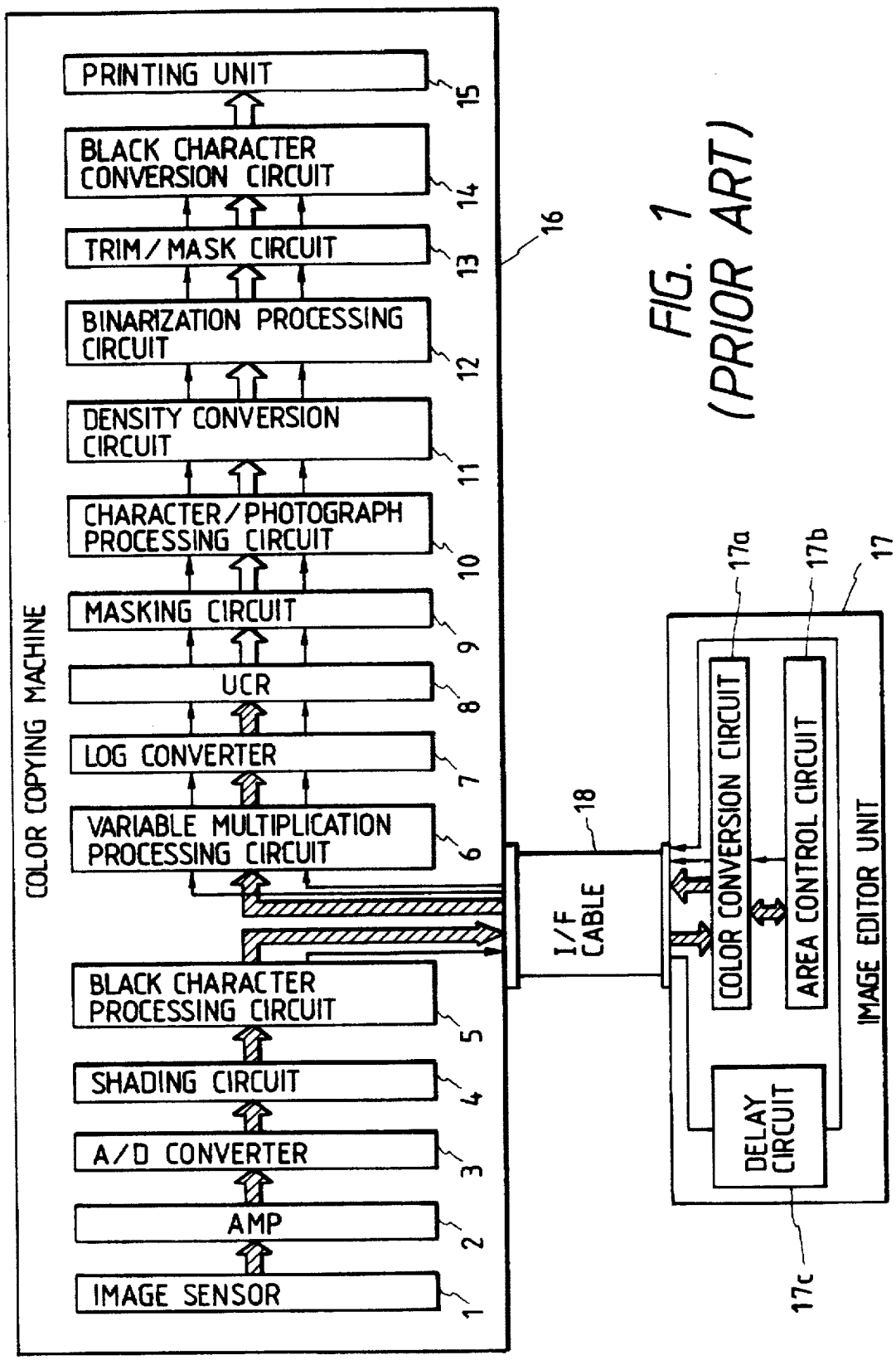
FIG. 1 is a block diagram showing a construction of a color copying machine of a conventional technique.
Figure 2:
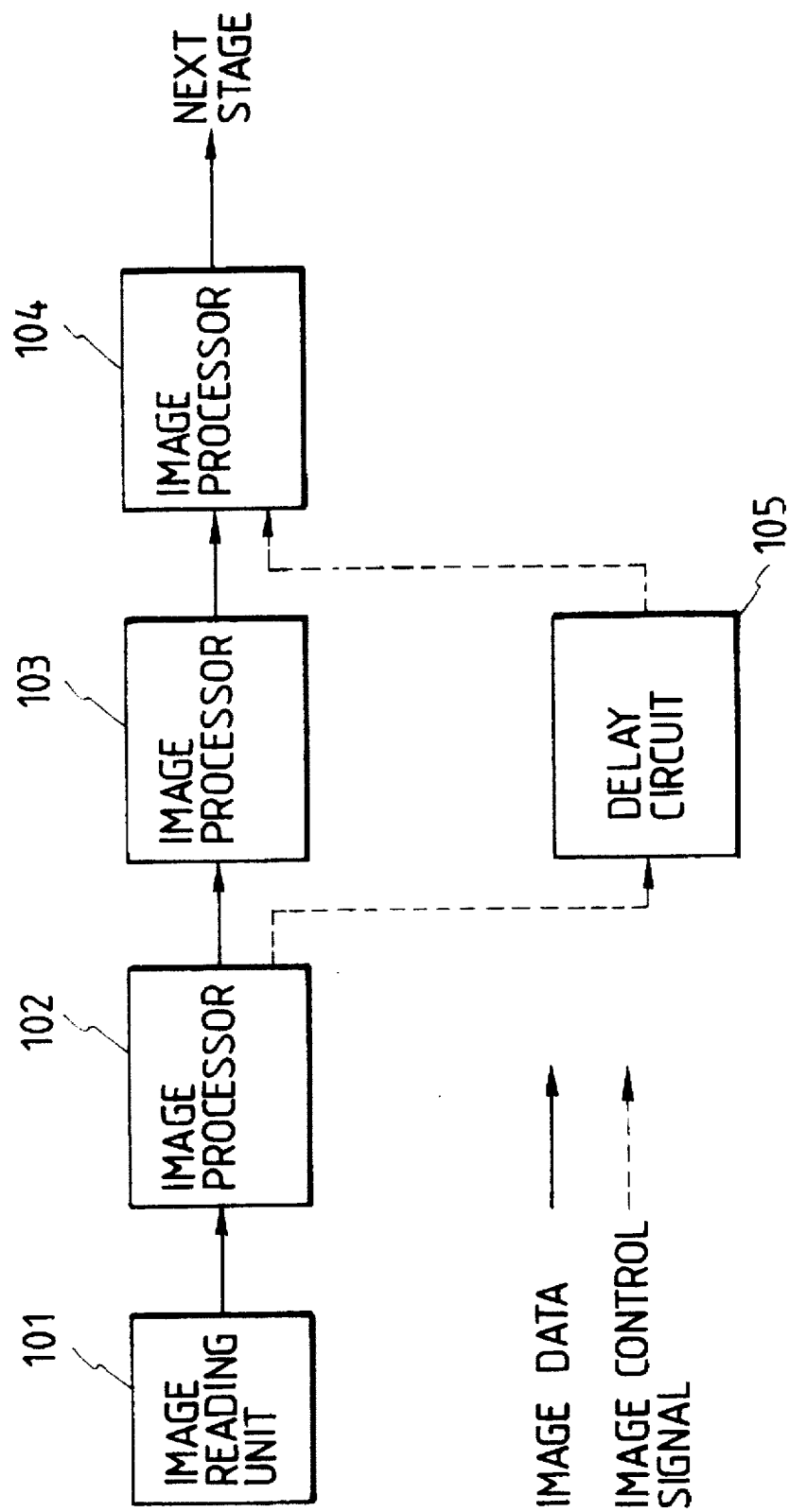
FIG. 2 is a block diagram showing a construction of another conventional technique.
Figure 11:
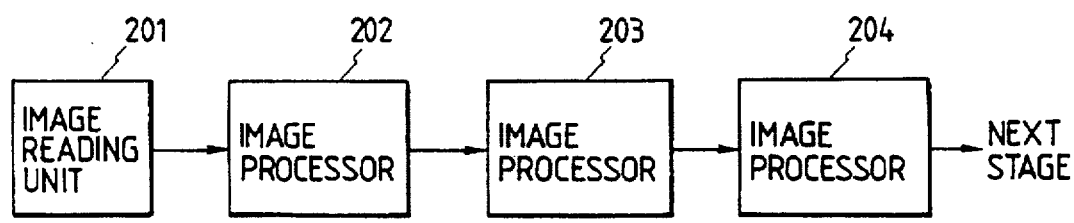
FIG. 11 is a block diagram showing a construction of another embodiment of the invention.

Although the embodiment has been described above with respect to the connection with the external interface, the invention is not particularly limited to the connection with the outside. As shown in a block diagram of FIG. 11, in the case where the image data which is read by an image reading unit 201 is subjected to an image process to produce image control signals by an image processor 202 and is further subjected to an image process using the image control signals by an image processor 204 via an image processor 203, according to the embodiment, there is no need to delay the image control signals by only a time which is required for the image process which is executed by the image processor 203, and the delay circuit 105 shown in FIG. 2 and described in the conventional technique is unnecessary.

Therefore, in the embodiment, since there is no need to calculate the delay amount, a mistake on design can be prevented. In addition, there is an advantage such that a degree of freedom for a change in design is large.

As described above, according to the invention, since the signal line to transmit and receive only the image control signals can be reduced, the connector or the like can be simplified and there is no need to synchronize the image data with the image control signals, so that the circuit construction can be simplified.

The present invention is not limited to the foregoing embodiment but many modifications and variations are possible within the spirit and scope of the appended claims of the invention.

What is claimed is:

1. A method of processing image data comprising plural pixels of an image, the image data including pixel data corresponding to each of the plural pixels, said method comprising the steps of:

generating pixel control data corresponding to each of the plural pixels, the pixel control data for each pixel representing whether that pixel is within a designated area of the image; and transmitting, for each pixel in the image, the pixel data and the pixel control data time-sequentially using a common cable.

2. A method according to claim 1, wherein the pixel data is comprised of plural bits and the pixel control data is comprised of plural bits; and wherein, in said transmitting step, when the pixel data and the pixel control data are transmitted time-sequentially, the plural bits of the pixel data are transmitted in parallel over the common cable and the plural bits of the pixel control data are transmitted in parallel over the common cable.

3. A method according to claim 1, wherein the pixel control data is comprised of plural bits, and each bit of the pixel control data represents whether a corresponding pixel belongs to a different designated area.

4. A method according to claim 3, further comprising the step of receiving the pixel data and the pixel control data transmitted in said transmitting step.

5. A method according to claim 4, further comprising the step of processing the received pixel data in accordance with whether a pixel represented by the pixel data is with the designated area, the processing being performed on the basis of the received pixel control data.

6. A method according to claim 5, wherein the designated area is an area of the image to be trimmed, an area to be masked, an area to be inverted negatively or positively, an area to be processed as a photograph, or an area to be represented as a black character.

7. A method according to claim 5, further comprising the step of forming an image on the basis of the pixel data processed in the processing step.

8. A method according to claim 3, wherein the pixel data represents n color components, wherein the method further comprises a step of generating, on the basis of the received pixel data and the received pixel control data, second pixel data which represents n+m color components, and wherein n and m are positive integers.

9. An apparatus for processing image data comprising plural pixels of an image, the image data including pixel data corresponding to each of the plural pixels, said apparatus comprising:

means for generating pixel control data corresponding to each of the plural pixels, the pixel control data for each pixel representing whether that pixel is within a designated area of the image; and means for transmitting, for each pixel in the image, the pixel data and the pixel control data time-sequentially using a common cable.

10. An apparatus according to claim 9, wherein the pixel data is comprised of plural bits and the pixel control data is comprised of plural bits; and wherein said transmitting means transmits the plural bits of the pixel data and the plural bits of the pixel control data in parallel over the common cable.

11. An apparatus according to claim 10, wherein the pixel control data is comprised of plural bits, and each bit of the pixel control data represents whether a corresponding pixel belongs to a different designated area.

12. An apparatus according to claim 9, further comprising means for receiving the pixel data and the pixel control data transmitted by said transmitting means.

13. An apparatus according to claim 12, further comprising means for processing the received pixel data in accordance with whether the corresponding pixel is within the designated area, the processing being performed on the basis of the received pixel control data.

14. An apparatus according to claim 13, wherein the designated area is an area of the image to be trimmed, an area to be masked, an area to be inverted negatively or positively, an area to be processed as a photograph, or an area to be represented as a black character.

15. An apparatus according to claim 13, further comprising means for forming an image on the basis of the pixel data processed by the processing means.

16. An apparatus according to claim 11, wherein the pixel data represents n color components, wherein the apparatus further comprises means for generating, on the basis of the received pixel data and the received pixel control data, second pixel data which represents n+m color components, and wherein n and m are positive integers.

17. An apparatus according to claim 16, wherein said transmitting means includes means for synchronizing transmission of the pixel data and the pixel control data with said means for generating the second pixel data which represents n+m color components.

18. An apparatus according to claim 9, wherein said generating means comprises means for reading an original document to generate the pixel data.

* * * * *

UNITED STATES PATENT AND TRADEMARK OFFICE
CERTIFICATE OF CORRECTION

PATENT NO. : 5,739,926
DATED : April 14, 1998
INVENTOR(S) : Takahashi et al.

It is certified that error appears in the above-identified patent and that said Letters Patent is hereby corrected as shown below:

COLUMN 1

Line 45, "image" should read --Image--.

COLUMN 2

Line 41, "arrows;" should read --arrows--.

COLUMN 4

Line 25, "invention image" should read --invention. Image--.

Line 34, "an image sensor is the" should read --the image sensor 1 is an--.

Signed and Sealed this

Twenty-second Day of September, 1998

Attest:

BRUCE LEHMAN

Attesting Officer     Commissioner of Patents and Trademarks